Nov. 8, 1966  F. H. WALTHER, JR  3,284,217
BASIC REFRACTORY
Filed Dec. 21, 1964

INVENTOR.
BY  FRANK H. WALTHER, JR.

William C. Nealon
ATTORNEY

United States Patent Office 3,284,217
Patented Nov. 8, 1966

3,284,217
BASIC REFRACTORY
Frank H. Walther, Jr., Bethel Park, Pa., assignor to Harbison-Walker Refractories Company, Pittsburgh, Pa., a corporation of Pennsylvania
Filed Dec. 21, 1964. Ser. No. 420,042
7 Claims. (Cl. 106—59)

This invention relates to basic refractory materials and to the fabrication of ceramically bonded, basic refractory shapes therefrom. More particularly, this invention relates to novel basic refractory fusion consisting of chrome ore and magnesia, and to brick made therefrom.

In contemporary steelmaking practices, one of three different types of furnaces normally are used; namely, the open hearth, the basic oxygen furnace, and the electric furnace. Steel is produced from iron in such furnaces by causing certain impurities in iron ore and in the resulting hot metal to go into a calcareous and ferruginous slag at temperatures usually in excess of 2900° F. Contemporary steelmaking technology is moving towards higher and higher refining temperatures, particularly with the advent of oxygen steelmaking processes in both the open hearth and the oxygen converter vessel. These higher temperatures have given rise to more demanding requirements for the refractory materials used to line the furnaces.

So-called "basic" refractories are conventionally used to line steelmaking furnaces. Basic refractories are usually made from combinations of material selected from the group consisting of dead burned magnesite, dead burned dolomite, olivine, forsterite, chrome ore, and occasionally hard burned lime. Today, in the open hearth and electric furnaces, the refractories consist of mixtures of dead burned magnesite and chrome ore. Coincidental with the more demanding requirements of the steelmaking industry, fused materials—in particular fused basic materials—have been looked to as offering greater resistance to corrosion and weakening at the elevated temperatures of steelmaking. Much of the fused basic refractory material known and used prior to this invention has been characterized by a distressing lack or loss of strength upon furnace heatup prior to reaching steelmaking temperatures.

In the United States patent to Field, No. 2,408,305, there is disclosed a basic, fused, refractory composition consisting of a solid solution of various spinels; for example, $FeO \cdot Cr_2O_3$, $MgO \cdot Cr_2O_3$, $MgO \cdot Fe_2O_3$, $MgO \cdot Al_2O_3$ and $FeO \cdot Al_2O_3$, which are alleged to have superior resistance to high iron, low alkaline slags.

The United States patent to Magri, No. 2,599,566, also discloses the fabrication of a fused basic refractory material of alleged improved thermal shock resistance. The Magri material consists of chrome spinel and a crystalline solid solution of iron and magnesia characterized by a siliceous matrix. Another United States patent to Magri, No. 2,690,974, discloses another fused material, similar to the one just discussed, allegedly of improved resistance to attack by iron oxide. This improved ability to resist iron oxide is alleged to be the result of careful and critical control of the amount of iron oxide in the fusion itself.

The recent United States patent to Charvat, No. 3,116,156, discloses still another approach to the fabrication of a fused basic refractory more able to resist the propensity of such fused materials to lose strength at elevated steelmaking temperatures. It is further alleged to have improved spalling properties, as well as ability to resist iron oxide bursting. The fusion of Charvat is alleged to consist of a novel micro-structure consisting of relatively large abutting grains of periclase, with exsolved deposits of spinel contained throughout the periclase. Silicates are stated to appear as isolated pockets within these same large periclase grains. The structure of Charvat is quite different from that of Magri and, also, apparently that of Field discussed above. A major difference is apparently the size of separate periclase grains or crystals within the Charvat structure, as well as envelopment of contained silicates, rather than having them present as films about periclase boundaries. The novel structure of Charvat is alleged to be attainable by critically and carefully controlled, very slow cooling and solidification of the fusion.

Accordingly, it is an object of the present invention to provide a novel, basic refractory fusion characterized by excellent high temperature strength, which can be manufactured according to usual fusion techniques without the requirement for special cooling treatments or the like. It is another object of the invention to provide a fusion of critically selected chrome ore and magnesia. It is yet another object of the invention to provide a ceramically bonded brick or shape made of a size graded fusion of critically selected chrome ore and magnesia. It is still another object of the invention to provide a ceramically bonded, basic refractory brick fabricated of a size graded novel fusion of critically selected chrome ore and magnesia, which brick exhibits high temperature strength superior to comparable brick made of other fusions presently known to me.

Briefly, according to one object of this invention, there is provided a basic refractory fusion consisting of comparatively small, closely packed, mostly abutting crystals of periclase. These periclase crystals are further characterized by a peppered distribution of exsolved spinel deposits dispersed substantially uniformly through the periclase crystals. Silicates, in large part, are found as isolated pockets in the spaces formed between the contiguous, somewhat rounded, periclase crystals. These spaces between contiguous periclase crystals are further characterized by euhedral spinel crystals which, together with the periclase, form a continuous intergrowth network. The analyses of refractory fusion within the concept of the present invention and on the basis of an oxide analysis are within the following ranges:

TABLE I

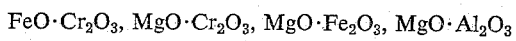

| | Acceptable Range | Preferred Range |
|---|---|---|
| Silica ($SiO_2$) | 0.5 to less than 4% | Up to 2%. |
| Alumina ($Al_2O_3$) | 0.5 to less than 5% | Up to 4%. |
| Iron Oxide (FeO) | 0.5 to less than 6% | Up to 5%. |
| Chromic Oxide ($Cr_2O_3$) | At least 15% | At least 20%. |
| Lime (CaO) | 0.5 to less than 3.0% | Up to 1.5%. |
| Magnesia (MgO) | At least 60% | At least 70%. |

In Table I, the "0.5%" lower limits for various subsidiary oxides is included to positively recite a range. The actual lower limits for these materials are dependent on economic considerations of how much one wishes to expend to beneficiate starting materials.

Other objects and further features and advantages of the present invention will become readily apparent to those skilled in the art from a study of the attached drawings. In these drawings.

Figure 3:
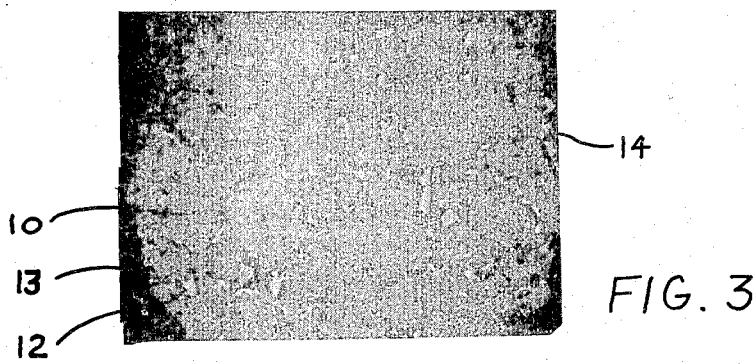

FIG. 3 is a photomicrograph of a refractory fusion according to the present invention, which fusion consists of many small and closely packed contiguous crystals of periclase, most of which are attached to each other, which crystals are further characterized by a peppering of exsolved spinel deposits. The boundary areas or spaces between periclase crystals contain euhedral spinel crystals which, together with periclase, form a contiguous intergrowth network. Silicates are in large part found in the boundary areas.

The best mode now known for fabricating a ceramically bonded refractory brick according to the concepts of this invention is as follows: A basic refractory fusion of the type disclosed in Table I, and having a chemical analysis within the preferred range, is crushed and size graded to form a brick-making batch having substantially the following sizing: about 30% passing a 4 mesh and resting on a 10 mesh screen, about 35% passing a 10 mesh and resting on a 28 mesh screen, with about 35% passing the 28 mesh screen. Of that material passing the 28 mesh screen, from 40 to 60% (preferably about 40%) passes the 325 mesh screen. The batch is tempered with about 4%, by weight, based on the weight of the refractory, of an aqueous tempering agent. The tempering agent is preferably about a 50:50 weight mixture of water and lignin solids. The tempered batch is formed on a conventional brick press under a pressure in the range 8000 to 10,000 p.s.i. The resulting shapes are fired at about 3000° F. with about a 10-hour hold at this temperature.

Referring to FIG. 3, the refractory fusion used to fabricate this brick consists of many comparatively small, closely packed, periclase crystals 10 characterized by a peppering of discrete exsolved spinel deposits 13. Boundary areas between contiguous periclase crystals are characterized by extensive euhedral spinel crystals 12, which cooperate with adjacent periclase crystals to form a continuous interlocking network. Silicates are found as isolated pockets 14 within the boundary area between periclase and spinel.

When it is stated the periclase crystals of the fusion of this invention are comparatively small, it is meant to infer that the average diameter is considerably less than 1 millimeter and more on the order of 0.1 to 0.3 millimeter in average diameter.

Figure 1:
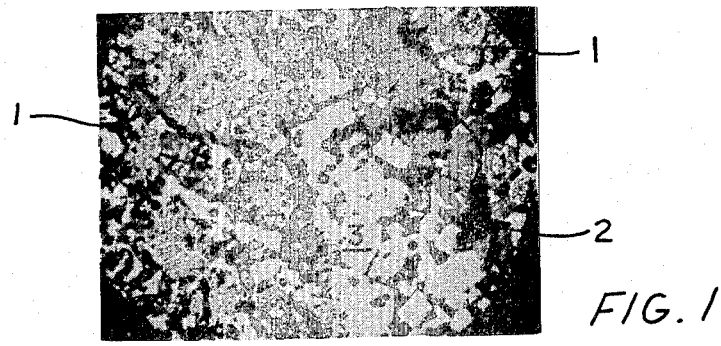
FIG. 1 is a photomicrograph of fused refractory made from a mixture of chrome ore and magnesia, characterized by relatively small periclase crystals and the presence of silicates as films between the crystals of periclase and spinel. It characterizes refractory of the type made according to the Magri patents, above discussed.

FIG. 1 is indicative of prior art fusion of a type having comparable, although usually somewhat smaller (0.01 mm.), periclase crystals 1. These crystals are surrounded by a substantially continuous silicate matrix 2. Reference numeral 3 indicates spinel deposits.

Brick made of fusion of the present invention have considerably better hot strength than fusion of the type shown in FIG. 1. It is theorized that this increased strength is due to the absence of silicate filming between adjacent periclase crystals. It is well known that silicates can be of very refractory character, but nowheres near as refractory as periclase. Thus, by causing direct attachment between periclase particles and isolating the silicates to pockets, a stronger structure is obtained.

Figure 2:
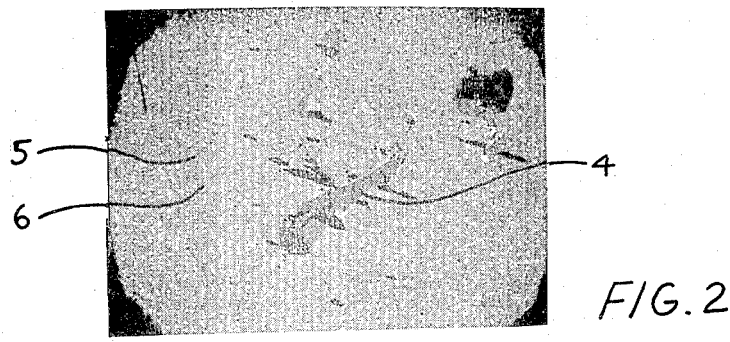
FIG. 2 is a photomicrograph of fused refractory of the type having relatively large periclase crystals characterized by extensive exsolved deposits of chrome spinel, and in which silicates are in large part found as isolated pockets through the periclase. It is fusion of the type recovered from the practice of the process disclosed in the Charvat patent.

FIG. 2 is indicative of one of the prior approaches to elimination of the silicate filming. It consists of a fusion of relatively large (1 mm. average diameter) periclase crystals 6 characterized by extensive deposits of exsolved spinel 5, and in which the silicates 4 are contained as isolated pockets within the periclase crystals.

The following examples are given not by way of limiting the scope of the present invention but, rather, to more readily explain and teach to those skilled in the art the manner of practicing the invention. It should be understood that the true spirit and scope of the invention is as defined in the hereafter appended claims.

Typical oxide analysis of the chrome ore and magnesia discussed in the following examples is set forth in the following table:

TABLE II.—RAW MATERIALS USED IN VARIOUS EXAMPLES

| | Magnesia | I Chrome Ore | II Chrome Ore | III Chrome Ore |
|---|---|---|---|---|
| Silica ($SiO_2$) | 0.7 | 2.3 to 4.7 | 5.5 | 3.0 |
| Alumina ($Al_2O_3$) | 0.3 | 8.0 to 10.0 | 29.2 | 15.7 |
| Iron Oxide (FeO) | 0.3 | 12.0 to 15.0 | 12.6 | 24.1 |
| Chromic Oxide ($Cr_2O_3$) | | 50.0 to 56.0 | 32.1 | 43.9 |
| Lime (CaO) | 0.8 | 0.1 to 0.7 | 0.6 | 0.3 |
| Magnesia (MgO) | 98.0 | 16.0 to 17.0 | 18.8 | 11.0 |
| Loss On Ignition | | 1.0 to 2.0 | 1.0 | 0.2 |

The purity range of raw materials usable, in the long run, is of course controlled by the required oxide chemical analysis of Table I.

*Example I*

A mixture was prepared consisting of 55%, by weight of caustic magnesia and 45% chrome ore III. This mixture was fused at an elevated temperature in a conventional electric arc furnace, and allowed to cool under ambient conditions of temperature and pressure to a solid state. The resulting fusion had the following oxide analysis:

TABLE III

| | Percent |
|---|---|
| Silica ($SiO_2$) | 2.1 |
| Alumina ($Al_2O_3$) | 9.1 |
| Fe as FeO | 10.4 |
| Chromic oxide ($Cr_2O_3$) | 21.6 |
| Lime (CaO) | 0.67 |
| Magnesia (MgO) | 56.13 |

When "ambient" conditions are dicussed in this application, it is meant to describe a natural curing from the fused molten state to a solid state and in the absence of any induced cooling or heating or extraneous curing or tempering procedures. For example, the fusion is poured into conventional molds and stored at room temperatures; for example, 70° F., until a cold solid state results.

This fusion of Example I is of the type shown in FIG. 1, including relatively small periclase and spinel deposits and a silicate matrix.

*Example II*

A mixture was prepared of about 60% caustic magnesia and about 40% chrome ore III. This material was fused in an electric furnace and cooled to a solid state under controlled conditions as defined in the Charvat patent, above noted, and had an oxide analysis substantially as follows:

TABLE IV

| | Percent |
|---|---|
| Silica ($SiO_2$) | 1.1 |
| Alumina ($Al_2O_3$) | 6.3 |
| Fe as FeO | 10.4 |
| Chromic oxide ($Cr_2O_3$) | 18.6 |
| Lime (CaO) | 0.6 |
| Magnesia (MgO) | 63.0 |

The resulting fusion is of the type shown in FIG. 2, and is mineralogically characterized by quite large periclase crystals, extensive exsolved spinel, and isolated silicate pockets being found throughout the crystals.

*Example III*

A mixture was prepared of 60% caustic magnesia and 40% chrome ore I in a manner identical to that discussed under Example I above. The resulting fusion had an oxide analysis typically as follows:

TABLE V

| | Percent |
|---|---|
| Silica ($SiO_2$) | 1.4 |
| Alumina ($Al_2O_3$) | 3.7 |
| Fe as FeO | 4.5 |
| Chromic oxide ($Cr_2O_3$) | 20.8 |
| Lime (CaO) | 0.4 |
| Magnesia (MgO) | 69.2 |

The resulting fusion is a shown in FIG. 3 and is characterized by relatively small, closely packed, mostly attached, but entirely contiguous crystals of periclase having exsolved spinel dispersed as separate and discrete entities through the periclase crystals. Boundary areas between periclase crystals are characterized by euhedral spinel crystals cooperating with the adjacent periclase crystals to form a continuous interlocking network. Silicates are located as isolated pockets between the euhedral spinel crystals and in the periclase crystal boundary areas.

*Example IV*

The fusion manufactured according to Example II was size graded into a particulate brickmaking batch having the preferred size grading set forth above, and manufactured into brick in the same manner as disclosed for the best mode now known for the fabrication of brick according to the present invention. These brick were compared with other exemplary ones, and subjected to physical testing as is reported in Table VIII hereafter.

*Example V*

The fusion of Example III was fabricated into brick in the same manner as dicussed under Example IV. The resulting brick were subjected to comparative physical testing, the results of which are also reported in Table VIII.

*Example VI*

A mixture is prepared of 60% caustic magnesia and 40% chrome ore II. The mixture is fused in the same manner as discussed under Example I, above, and has the following typical oxide analysis:

TABLE VI

| | Percent |
|---|---|
| Silica ($SiO_2$) | 2.5 |
| Alumina ($Al_2O_3$) | 11.4 |
| Fe as FeO | 5.4 |
| Chromic oxide ($Cr_2O_3$) | 12.8 |
| Lime (CaO) | 0.8 |
| Magnesia (MgO) | 66.8 |

Brick were fabricated of this fusion in the same manner as discussed under Example IV above. It will be seen that one outstanding difference between the fusion of this example and that of Example III is the $Al_3O_2$ content and chromic oxide content. The results of physical testing of these brick are also reported in Table VIII hereafter.

*Example VII*

A mixture was fabricated of 60% caustic magnesia and 40% chrome ore III. This mixture was fused, cooled, made into brick, and subjected to physical testing identical to that discussed with reference to the fusion of Example III and brick of Example IV. This fusion had an oxide analysis typically as follows:

TABLE VII

| | Percent |
|---|---|
| Silica ($SiO_2$) | 2.1 |
| Alumina ($Al_2O_3$) | 7.3 |
| Fe as FeO | 10.2 |
| Chromic oxide ($Cr_2O_3$) | 16.1 |
| Lime (CaO) | 0.8 |
| Magnesia (MgO) | 68.5 |

It should be noted this fusion also has a high alumina content and lower chromic oxide content, as compared to the fusion of this invention, Example III.

TABLE VIII.—TWO HIGH TEMPERATURE STRENGTH TESTS

| Example No. | IV | V | VI | VII |
|---|---|---|---|---|
| Modulus of Rupture, p.s.i. (Transverse Strength): At 2600° F. (hold time 5 hrs.) (av. 3) | 1,040 | 1,490 | 1,250 | 970 |
| Load Test (Compressive Strength): Maintained load of 25 p.s.i. at 3100° F., percentage subsidence after 90 minutes | 0.3 | 0.1 | 3.0 | 2.3 |

The data of Table VIII clearly demonstrate that brick according to the concepts of the present invention made from the fusion of this invention have superior strength, as measured by modulus of rupture and subsidence at elevated temperature under a maintained load, as compared to any of the other exemplary fusions tested. It provided almost a 50% increase in modulus of rupture measured at 2600° F., as compared to the brick of Example IV which were made of the fusion of Example II. Note, also, the brick of Examples VI and VII are identical, in all respects, to the brick of Example V made according to this invention, except Philippine or Transvaal chrome ore (chrome ores II and III of Table II) was used instead of Iranian chrome ore (chrome ore I in Table II), thereby providing a far greater $Al_2O_3$ content. It is one of the more important and critical features of the present invention that the $Al_2O_3$ content of the fusion be maintained extremely low and, in any event, less than 5%, by weight.

Another surprising characteristic of brick fabricated of fusion according to this invention is the extremely low subsidence at 3100° F. as compared to those of Examples VI and VII.

The precise reasons or phenomena which provide the superior brick of this invention, which are so outstanding, is not completely understood. It is believed, in large part, to be the result of the interlocking network of exsolved euhedral spinel crystals, which appear between the periclase crystals. This intergrowth of euhedral spinel and periclase, which serves to isolate the silicates into discontinuous pockets, is no doubt another explanation. It is further believed to be, in some part, associated with the composition of the spinel crystals. It is understood in the art that spinels have the general formula $RO \cdot R_2O_3$. The RO components are, of course, magnesia and/or ferrous oxide FeO. The $R_2O_3$ components can be one or more of the oxides $Fe_2O_3$, $Cr_2O_3$, and $Al_2O_3$. By assuring very small amounts of $Al_2O_3$ and FeO, it is believed the resulting intergrowth of euhedral spinel and periclase of this invention preferentially is promoted, thereby assuring the novel interlocking network which characterizes the fusion of this invention.

The foregoing examples and discussion establish that, by judicious selection of the chrome ore and magnesia used in the mixture of chrome ore and caustic magnesia to be fused, superior fused grain can be obtained by conventional techniques without the necessity of specialized tempering or curing techniques.

In the foregoing discussion, all size grading is according to the Tyler series of screens. All chemical analyses are on the basis of an oxide analysis, in conformity with the common practice of reporting the analysis of refractory materials. While the oxide analyses of the various materials and products reported should be considered but typical, the reported quantities of alumina, iron oxide, and chromic oxide are considered critical.

Having thus described the invention in detail and with sufficient particularly as to enable those skilled in the art to practice it, what is desired to have protected by Letters Patent is set forth in the following claims:

I claim:

1. A fusion of chrome ore and magnesia consisting of, by weight, on an oxide basis:

| | |
|---|---|
| Silica (SiO$_2$) | Less than 4%. |
| Alumina (Al$_2$O$_3$) | Less than 5%. |
| Iron oxide (Fe$_2$O$_3$) | Less than 6%. |
| Chromic oxide (Cr$_2$O$_3$) | At least 15%. |
| Lime (CaO) | Less than 3%. |
| Magnesia (MgO) | At least 60%. | said fusion characterized by a microstructure consisting of relatively small, closely packed, mostly attached crystals of periclase, said crystals of periclase having an average diameter of about 0.1 to about 0.3 millimeter, said crystals of periclase characterized by extensive exsolved separate and discrete spinel deposits throughout said periclase crystals, boundary areas between contiguous periclase crystals characterized by extensive euhedral spinel crystal development forming with the periclase crystals an intergrown network isolating contained silicates into dispersed pockets.

2. A fusion of chrome ore and magnesia consisting of, by weight, on an oxide basis:

| | |
|---|---|
| Silica (SiO$_2$) | Up to 2%. |
| Alumina (Al$_2$O$_3$) | Up to 4%. |
| Iron oxide (FeO) | Up to 5%. |
| Chromic oxide (Cr$_2$O$_3$) | At least 20%. |
| Lime (CaO) | Up to 1.5%. |
| Magnesia (MgO) | At least 70%. | said fusion characterized by a microstructure consisting of relatively small, closely packed, mostly attached crystals of periclase, said crystals of periclase having an average diameter of about 0.1 to about 0.3 millimeter, said crystals of periclase characterized by extensive exsolved separate and discrete spinel deposits throughout said periclase crystals, boundary areas between contiguous periclase crystals characterized by extensive euhedral spinel crystal development forming with the periclase crystals an intergrown network isolating contained silicates into dispersed pockets.

3. A refractory fusion of chrome ore and magnesia consisting of at least 20%, by weight, of chromic oxide; at least 70% magnesia, less than 4% alumina; less than 5% ferrous oxide; less than 2% silica; the structure of said refractory fusion comprising small closely packed mostly attached crystals of periclase, said crystals of periclase having an average diameter of about 0.1 to about 0.3 millimeter, and exsolved spinel dispersed as discrete patches within said periclase crystals; the areas between periclase crystals having euhedral spinel crystals forming a continuous intergrown network isolating pockets of silicates within the periclase crystal boundaries.

4. A refractory fusion of chrome ore and magnesia consisting of at least 15% Cr$_2$O$_3$; at least 60% MgO; less than 5% Al$_2$O$_3$; less than 5% FeO; less than 4% SiO$_2$; less than 3% CaO; the structure of said refractory fusion comprising closely packed mostly attached crystals of periclase, said crystals of periclase having an average diameter of about 0.1 to about 0.3 millimeter, exsolved spinel dispersed as discrete patches within said periclase crystals; boundary areas between said periclase crystals having euhedral spinel crystals together forming a continuous intergrown network isolating pockets of silicates within the periclase crystal boundaries.

5. A refractory shape made from a batch comprising a particulate refractory fusion consisting of 15%, by weight, Cr$_2$O$_3$; 60% MgO; less than 5% Al$_2$O$_3$; less than 5% FeO; less than 4% SiO$_2$; less than 3% CaO; the structure of said refractory fusion comprising small closely packed mostly attached crystals of periclase, said crystals of periclase having an average diameter of about 0.1 to about 0.3 millimeter, boundary areas between said periclase crystals having euhedral spinel crystals together forming a continuous intergrown network isolating pockets of silicates within the periclase crystal boundaries.

6. A fusion made from a batch mixture consisting essentially of Iranian chrome ore and magnesite of sufficient purity to obtain an oxide analysis as follows:

| | |
|---|---|
| Silica (SiO$_2$) | 0.5 to less than 3.0%. |
| Alumina (Al$_2$O$_3$) | 0.5 to less than 5%. |
| Iron oxide (FeO) | 0.5 to less than 6%. |
| Chromic oxide (Cr$_2$O$_3$) | At least 15%. |
| Lime (CaO) | 0.5 to at least 3.0%. |
| Magnesia (MgO) | At least 60%. | said fusion having a microstructure consisting essentially of closely-packed, mostly-attached crystals of periclase, said crystals of periclase having an average diameter in the range about 0.1 to 0.3 millimeter, exsolved spinel dispersed as discrete deposits within said periclase crystals; boundary areas between said periclase crystals having euhedral spinel crystals together forming a continuous intergrown network isolating pockets of silicates within the periclase crystal boundaries.

7. A fusion made from a batch mixture consisting essentially of Iranian chrome ore and magnesite of sufficient purity to obtain an oxide analysis as follows:

| | |
|---|---|
| Silica (SiO$_2$) | Up to 2%. |
| Alumina (Al$_2$O$_3$) | Up to 4%. |
| Iron oxide (FeO) | Up to 5%. |
| Chromic oxide (Cr$_2$O$_3$) | At least 20%. |
| Lime (CaO) | Up to 1.5%. |
| Magnesia (MgO) | At least 70%. | said fusion having a microstructure consisting essentially of closely-packed, mostly-attached crystals of periclase, said crystals of periclase having an average diameter in the range about 0.1 to 0.3 millimeter, exsolved spinel dispersed as discrete deposits within said periclase crystals; boundary areas between said periclase crystals having euhedral spinel crystals together forming a continuous intergrown network isolating pockets of silicates within the periclase crystal boundaries.

References Cited by the Examiner

UNITED STATES PATENTS 3,116,156  12/1963  Charvat _____ 106—59
3,132,954  5/1964  Alper et al. _____ 106—59

TOBIAS E. LEVOW, *Primary Examiner.*

J. E. POER, *Assistant Examiner.*